United States Patent Office 3,412,560
Patented Nov. 26, 1968

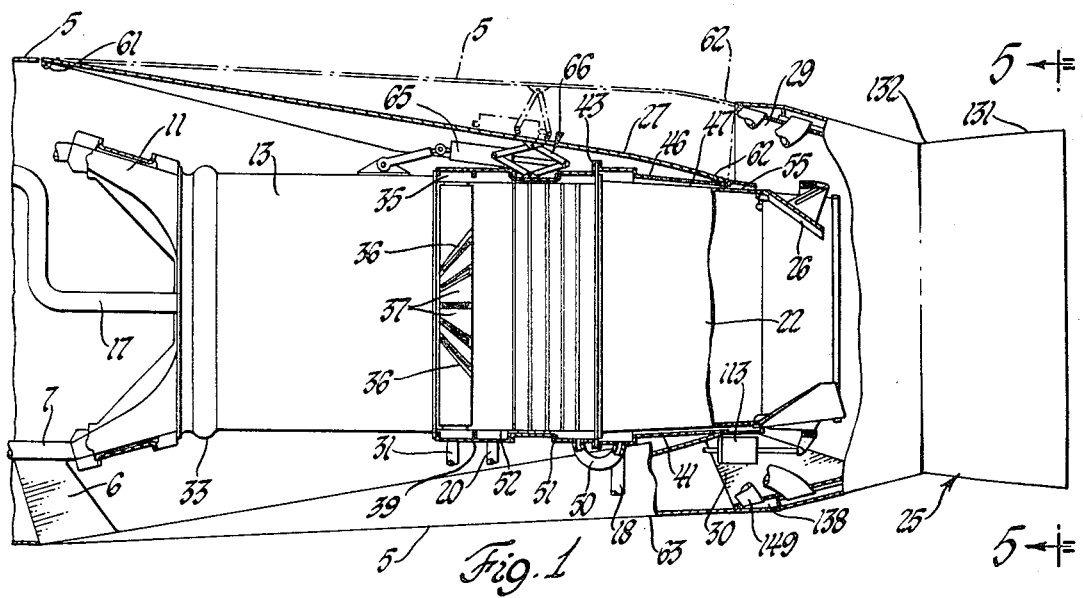
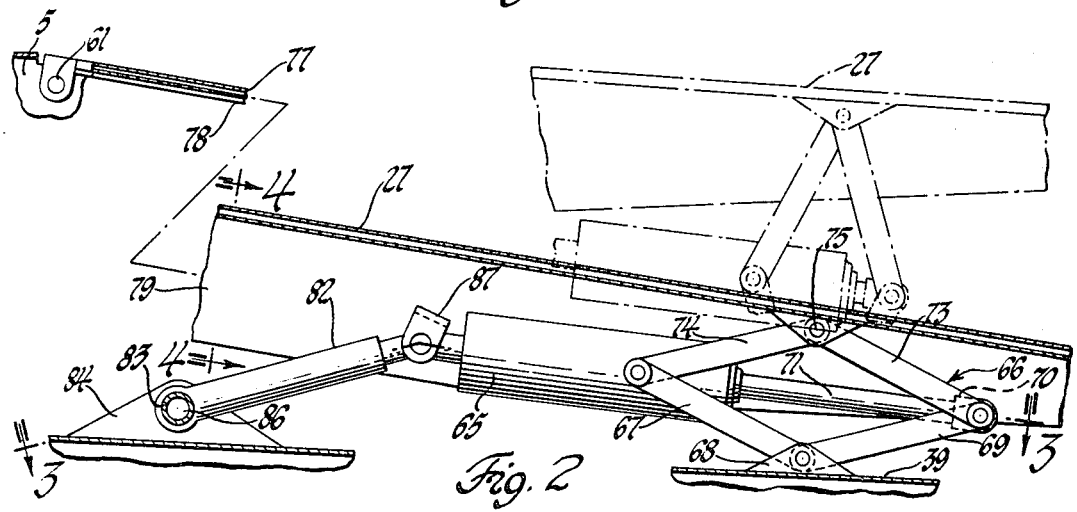
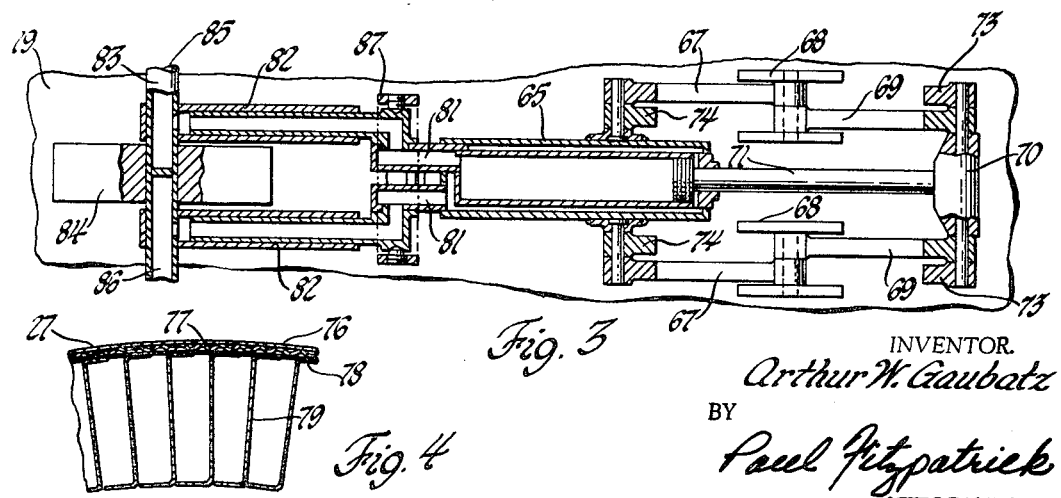

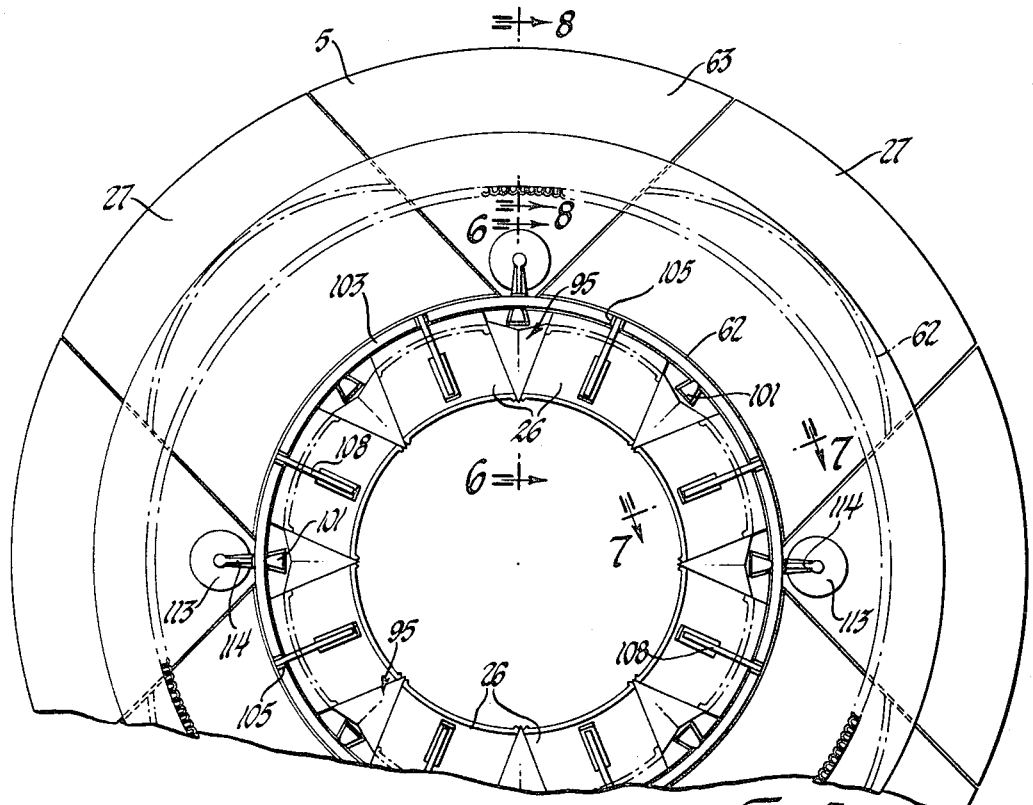

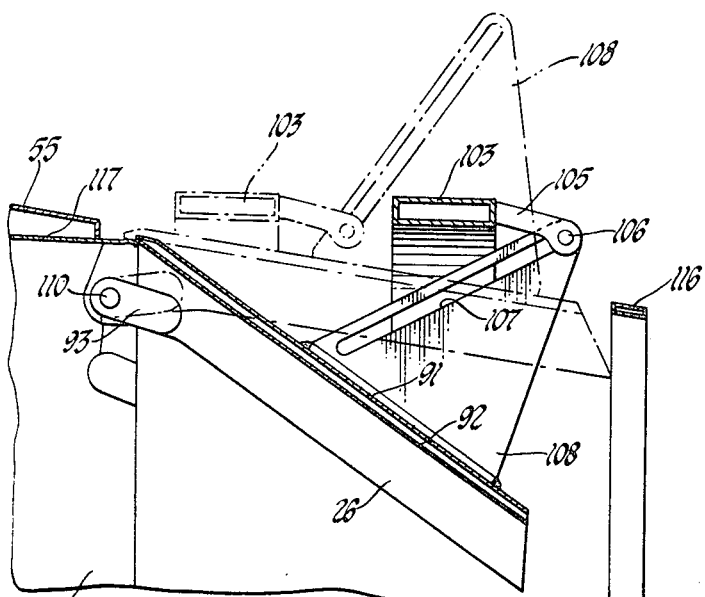
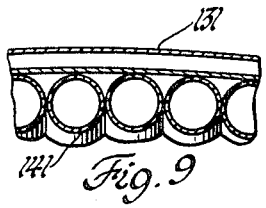
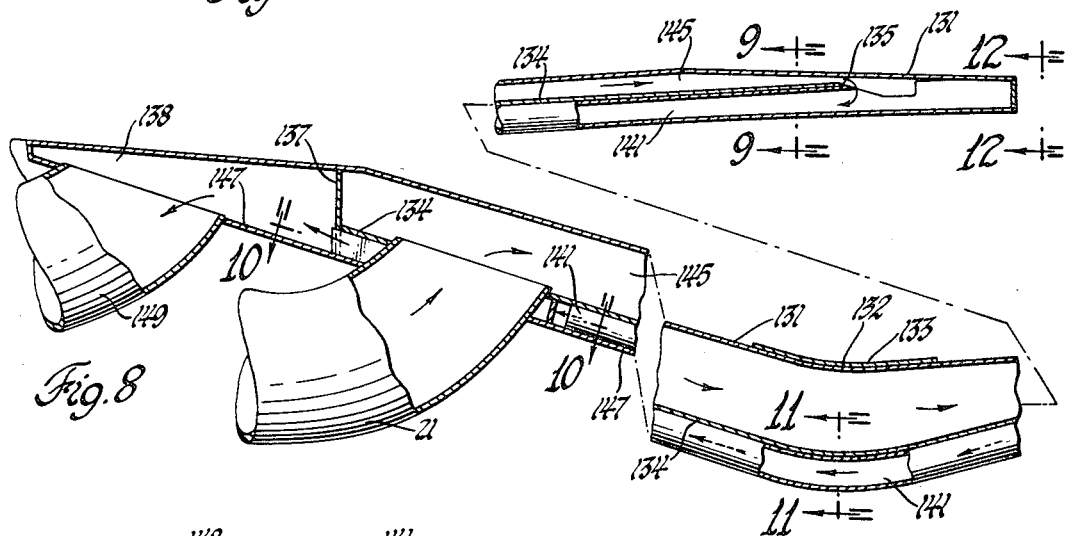
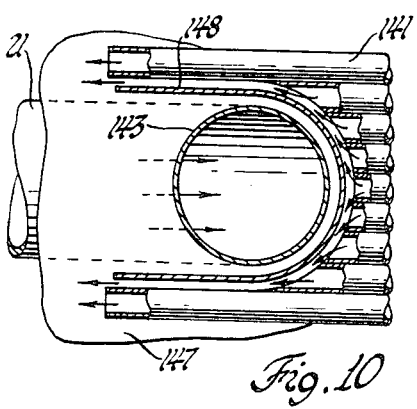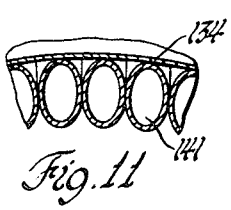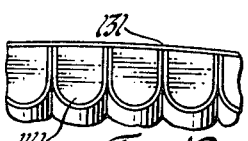
INVENTOR.
Arthur W. Gaubatz
BY
Paul Fitzpatrick
ATTORNEY

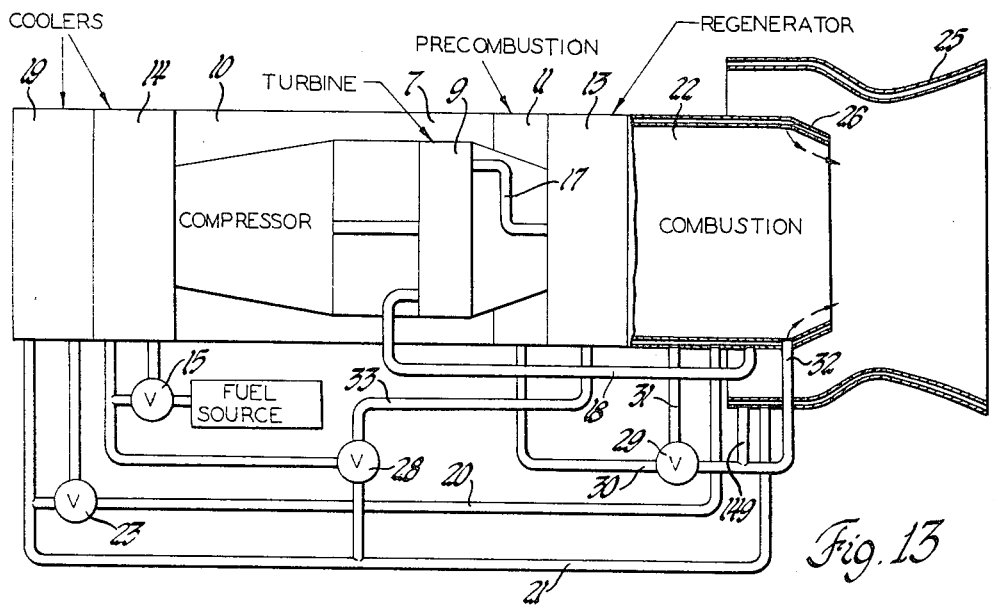
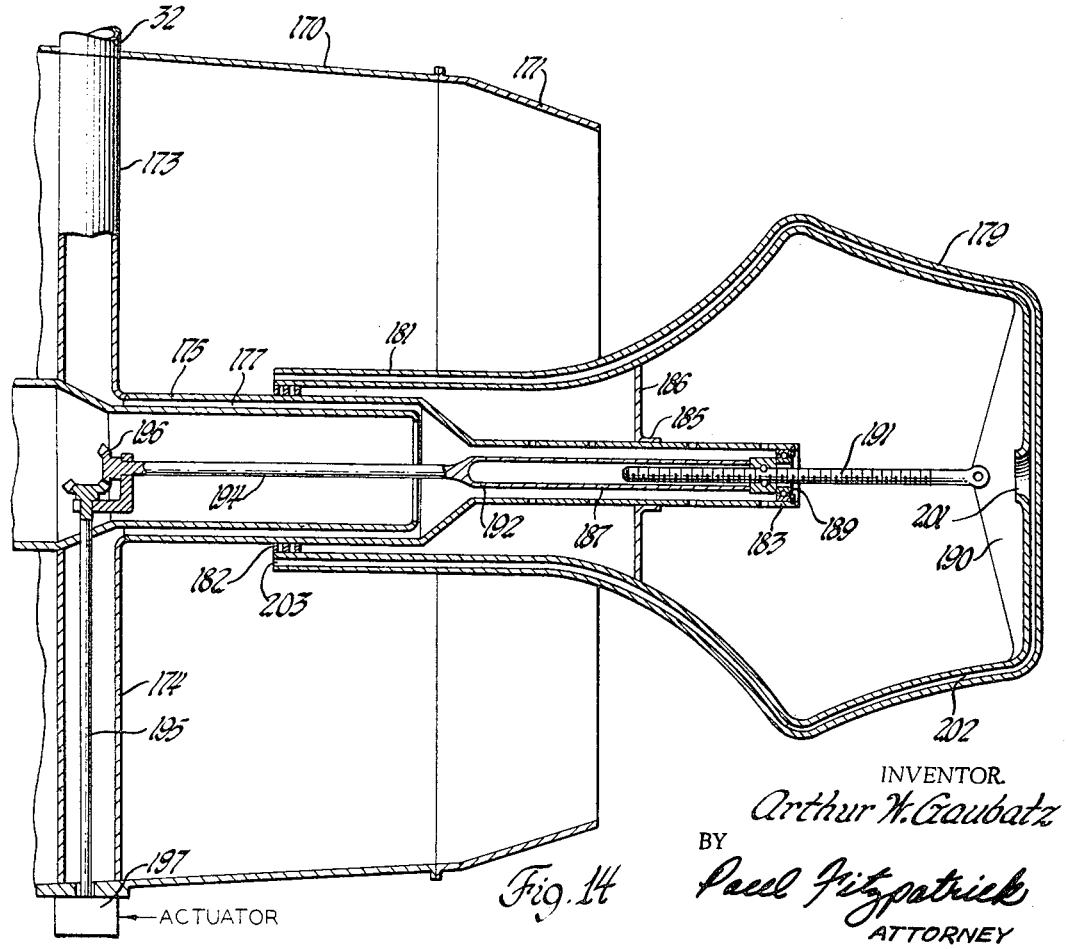

3,412,560
JET PROPULSION ENGINE WITH COOLED COMBUSTION CHAMBER, FUEL HEATER, AND INDUCED AIR-FLOW
Arthur W. Gaubatz, Indianapolis, Ind., assignor to General Motors Corporation, Detroit, Mich., a corporation of Delaware
Filed Aug. 3, 1966, Ser. No. 570,064
3 Claims. (Cl. 60—261)

ABSTRACT OF THE DISCLOSURE

A jet propulsion engine has a fuel cooled combustion chamber with a chamber outlet nozzle also fuel-cooled. The combustion chamber discharges into a fuel-cooled convergent-divergent jet propulsion nozzle which has an air entry around the combustion chamber. Means are provided for variably admitting ambient boundary layer air into the jet propulsion nozzle. Fuel for combustion is also heated in a heat exchanger disposed between a precombustion chamber, in which some fuel is burned, and the main combustion chamber.

My invention is directed to jet engines and particularly to jet propulsion nozzle systems of such engines. In its preferred form, the invention is embodied in a jet propulsion device including a fuel-cooled combustion chamber with variable area outlet means also cooled by fuel, a fuel-cooled convergent-divergent jet propulsion nozzle downstream from the combustion apparatus, and variable means for admitting ambient air to the nozzle adjacent the throat of the convergent-divergent nozzle for induction into the nozzle by the discharge from the combustion chamber. In certain aspects, the invention is particularly suited to engines operating on gaseous fuel.

The principal objects of the invention are to provide an efficient jet propulsion device capable of operation at very high temperatures and suited for operation over a wide spectrum of jet propulsion with respect to altitude and speed of the vehicle in which the device is used. The nature of the invention and the advantages thereof will be clear to those skilled in the art from the succeeding detailed description of the preferred embodiment of the invention and the accompanying drawings thereof.

FIGURE 1 is an elevation view, with parts cut away and in section, of the exhaust end of a jet propulsion engine having provision for fuel heating and fuel burning in the exhaust system.

FIGURE 2 is an enlarged view of a portion of FIGURE 1 illustrating the secondary air inlet doors.

FIGURE 3 is a sectional view taken on the plane indicated in FIGURE 2 showing the arrangement of actuators for the air inlet doors.

FIGURE 4 is a fragmentary cross section through an air inlet door indicated in the plane indicated in FIGURE 2.

FIGURE 5 is a rear elevation view of the discharge end of the exhaust system taken on the plane indicated in FIGURE 1.

FIGURES 6 and 7 are partial sectional views, taken on the planes indicated in FIGURE 5, illustrating the variable combustion chamber outlet means.

FIGURE 8 is a longitudinal sectional view illustrating the cooling arrangement for the convergent-divergent jet nozzle, taken on the plane indicated in FIGURE 5.

FIGURES 9, 10, 11, and 12 are fragmentary sectional views taken on planes indicated on FIGURE 8.

FIGURE 13 is a schematic diagram of an engine showing the principal fuel circuits.

FIGURE 14 is a somewhat simplified representation of a plug-type variable outlet for the combustion chamber.

Referring first to FIGURES 1 and 13, the engine is enclosed in an outer housing 5 exposed to ambient boundary layer air, such as a fuselage or nacelle. Suitably supported within the housing, as by struts 6, is an annular air duct 7 inside which is mounted a turbine 9 which is preferably of the type described and claimed in my U.S. Patent No. 3,368,794. The turbine drives a compressor 10 which is preferably of the type described and claimed in my U.S. Patent No. 3,365,125. The annular air duct 7 carries combustion air which may be compressed by the ram effect of forward motion of an aircraft, by the compressor, or both, and preferably by both when the aircraft is in rapid motion. This air serves to burn fuel supplied to the engine which is preferably originally a cold liquid and is vaporized in the engine.

The air is supplied first from duct 7 to a precombustion chamber 11 within which a portion of the fuel may be burned, depending upon operating conditions. The air, or air and combustion products, then flows through a cylindrical heat exchanger 13 to which the fuel is supplied from a suitable source by pumping and control means (not illustrated). The heated air flows from the regenerator into combustion chamber 22.

As indicated in FIGURE 13, the fuel may flow from the controlled source through an inlet air cooler 14 which may be bypassed by a valve 15 to the heat exchanger 13 and then through a conduit 17 to the turbine 9 where it expands and is cooled.

The fuel exhausted from the turbine is burned, ordinarily most of it in the combustion chamber 22, although part of it may be burned in the precombustion chamber 11. Before reaching these, however, the turbine exhaust is circulated through a line 18 and the hollow wall of the combustion chamber 22 and through a second inlet air precooler 19 to which fuel is directed through a conduit 20 and returned by way of a conduit 21. A valve 23 provides for bypassing the second inlet cooler to the extent desired.

The combustion chamber 22 discharges through a convergent outlet section into the throat of a convergent-divergent jet propulsion nozzle 25. The area of the combustion chamber outlet is variable as by a ring of movable flaps 26 or an axially movable plug, as will be described in connection with FIGURE 14.

The provision for admission of secondary air to the jet nozzle involves four doors 27 which swing in from a position coincident with the outer wall 5 to the position indicated at the upper part of FIGURE 1 to admit boundary layer air into an annular entry 29 around the combustion chamber 22. Struts 30 support the rear end of the combustion apparatus. The combustion chamber flaps 26 and the secondary air doors 27 may have their position varied over the range from maximum opening to minimum opening in accordance with the operating conditions of the jet propulsion engine and the vehicle. My invention is not concerned with the means for controlling these, but rather with the provision of structure providing for flexibility of operation and including provisions for cooling such that the mechanism is capable of resisting hot combustion gases. The details of the preheating and combustion apparatus also are immaterial to this invention.

Returning to the fuel circuit; as previously pointed out, the fuel after passing through the regenerator, turbine, combustion chamber cooling jacket, and second precooler, is supplied to a line 21. Some of the fuel exhausting from the first precooler bypasses the regenerator, combustion chamber jacket, and second precooler under control of a turbine control valve 28. The total fuel flow is carried through double walls, to be described, of the convergent-divergent jet nozzle 25 and is returned to a valve 29 which divides the flow between a line 30 to the precombustion chamber and a line 31 to the main combustion chamber. A small portion of this fuel is tapped off ahead of valve 29 into a line 32 by which it is directed to cool the variable jet nozzle 26 and is burned. The fuel line from valve 28 to the regenerator is indicated as 33 in FIGURES 1 and 13.

The line 31 leading to the combustion chamber communicates by way of a manifold 35 with fuel nozzles 36, and the combustion air flows from the regenerator 13 through spaces 37 between the fuel nozzles. The combustion takes place within the generally cylindrical chamber 22. Suitable ignition means (not illustrated) may be provided. The casing of the combustion chamber 22 comprises a forward portion 39 and a rear portion 41 coupled at the bolting flange 43. These two sections are double-walled so as to provide a cooling jacket the length of the combustion chamber. Fuel admitted through line 18 is caused to flow between the outer wall 46 and the inner wall 47 of the rear portion of the combustion chamber except for the extreme rear portion beyond a barrier 49 (FIGURE 6). After circulating in through this jacket, the fuel is transferred through a line 50 to the cooling jacket of the forward portion of the combustion chamber between the outer wall 51 and the inner wall 52 and is discharged through line 20 for further control and utilization. The extreme rear end of the combustion chamber is surrounded by a manifold 55 to which gaseous fuel is supplied through line 32 and from which it is discharged to cool the segments or flaps 26 of the combustion chamber outlet control.

Secondary air inlets

We may now proceed to a description of the secondary air inlet doors 27 shown principally on FIGURES 1 to 5. There are four of these doors which are of slightly curved generally rectangular shape. Each door is hinged to the nacelle wall 5 by a hinge connection 61 at its forward edge. The trailing or downstream edge 62 of the door can be moved between the positions shown in solid and in broken lines in FIGURES 1 and 5. A portion 63 of the nacelle wall of generally quadrantal cross section occupies each of the four gaps between the doors 27. The doors are held in any desired position between the outer or closed inlet position and the inner or wide open inlet poritions by a pneumatic cylinder 65 and linkage 66 at each door. The open position is illustrated in solid lines in FIGURES 1 and 2 and the closed position in broken lines.

Each parallelogram linkage 66 includes links 67 pivoted on brackets 68 fixed on the outer wall 39 of the combustion chamber. Links 69 likewise pivoted on these brackets are pivoted to a head 70 on the piston rod 71 of the cylinder 65. Links 73 parallel to links 67 and links 74 parallel to links 69 are pivoted on the head 70 and cylinder 65, respectively, and have a common pivot axis at 75 on a bracket extending inwardly from the wall of the door 27. As shown in FIGURE 4, the outer wall of door 27 is a double wall having an outer sheet 76, an intermediate corrugated spacer 77, and an inner sheet 78, and is reinforced by flanged ribs 79 which taper towards the ends of the door. The cylinder 65 is supported by the parallelogram linkage and therefore moves in operation. The assembly includes a swivel pipe connection to the fixed structure of the regenerator case. As shown in FIGURE 3, the cylinder is double-walled and has two fluid supply connections 81 which have a swivel connection to telescoping tubes 82 which in turn are swiveled on a hollow shaft 83 mounted in a bracket 84 on the wall of regenerator 19. The hollow shaft is plugged at its center and has fluid connections 85 and 86 at its ends which connect through lateral openings in the shaft to the interior of tubes 82. Tubes 82 are maintained in engagement with the inlets 81 by a clamp 87.

Variable combustion chamber outlet

The arrangement of variable flaps 26 to vary the area of the combustion chamber outlet is shown principally in FIGURES 1, 5, 6, and 7. There are eight flaps 26, each of generally rectangular outline and arcuate cross section as seen clearly in FIGURES 5 and 7. The flaps are double-walled, having an outer sheet 91 and inner sheet 92 suitably connected as by a corrugated intermediate sheet. Brackets 93 projecting from the two forward corners of the flap are pivoted on the fixed structure of the engine. This fixed structure comprises eight intermediate wall elements 95 which have an outer wall 97, side walls 98 converging at a 45° angle, and an inner wall 99. Walls 97 and 99 diverge from a ring 100 at the forward edge of the intermediate members at which they are joined at the walls of the manifold 55. The side edges of the flaps 26 slide over the side walls 98 of the intermediate members as the flaps are moved in and out. Each intermediate member bears a longitudinal sheet metal rib 101 upon which a flap actuating ring 103 is slidable. Ring 103 mounts eight brackets 105 each bearing a pin 106 which slides in a cam slot 107 of a cam 108. The cams 108 extend radially from the outer surface of the flaps 26. As shown clearly by the solid and broken line views in FIGURE 7, reciprocation of ring 103 moves the flaps between their wide open and minimum open position. The flaps are pivoted by pins 110 which are received in brackets 111 extending from the forward corners of the intermediate members 97. The ring 103 is reciprocated by four fixed hydraulic cylinders 113, spaced around the circumference of the combustion chamber, the piston rods 115 of which are connected to the rod by brackets 114. A hoop 116 limits outward movement of flaps 26.

As indicated by FIGURE 13, a line 32 brings gaseous fuel to the ring manifold 55 at the rear end of combustion chamber 22. This gas is discharged through holes 117 in the wall of combustion chamber 22 so as to flow over the inner surface of the variable flaps 26, cooling the flaps and shielding them by the reducing fuel rich gas from the hot combustion products which may contain oxygen. Means (not illustrated) may also be provided to circulate some of this gas through the fixed structure of the intermediate wall 95.

Jet propulsion nozzle

The combustion chamber 22 and the air inlet doors 27 supply combustion products and induced nacelle boundary layer air into the convergent-divergent jet propulsion nozzle 25. This is a metal structure through which some of the fuel on its way to the combustion chamber and the precombustion chamber is circulated to keep the nozzle sufficiently cool in spite of the hot combustion gases discharged through it. This nozzle is shown in FIGURES 1, 5, and 8 to 12. In general, it comprises an outer wall 131 which is of biconical shape with a waist at 132 which is reinforced by a circumferential strip 133. It also comprises an inner wall 134 spaced from the outer wall and terminating short of it at 135 near the exit end of the nozzle. A circumferential ring 137 extending between the two walls is the rear boundary of a fluid outlet manifold 138 extending around the forward end of the nozzle. The interior of the nozzle is lined with axially extending tubes 141 which are cooled by fuel circulating from the exit end of the nozzle to the manifold 138. This fuel is supplied by one or more ducts 21 into the forward end of the space 145 between the two walls through which it flows to the rear end of the nozzle and back through tubes 141. Most of the tubes 141 terminate just ahead of wall 137 and discharge into manifold 138. The inner wall of manifold 138 is defined by a third sheet 147 which is disposed within the forward end of the layer of tubes 141. A U-shaped metal strip 148 extending between the sheets 134 and 147 defines a space around the inlet pipe 143.

The tubes which are aligned with the barriers 148 terminate short of it. The fuel which is circulated through the cooled jet nozzle wall discharges from manifold 138 through a pipe or pipes 149 to the valve 29 which controls its admission to the combustion apparatus.

*Plug type combustion chamber*

FIGURE 14 illustrates an alternative form of combustion chamber with variable outlet which may be used instead of the corresponding structure shown in FIGURE 1. FIGURE 14 illustrates the rear portion of a combustion chamber 170 which terminates in a converging nozzle 171. Air and fuel may be supplied to the combustion chamber by any suitable means such as those illustrated in connection with FIGURE 1. A plurality of struts, including struts 173 and 174, extend inwardly from the wall of the combustion chamber to define a supporting spider for a double-walled nozzle plug support 175. Cooling fluid, such as gaseous fuel, is supplied through line 32 and strut 173 to the passage 177 between the walls of the support 175.

The plug 179 which acts to vary the combustion chamber outlet includes a hollow stem 181, the forward end of which is slidable upon the support 175, a sliding seal 182 being provided between the two. The support 175 includes a rear portion 183 of reduced diameter on which is slidable a collar 185 connected to the interior of plug 179 by an open-work spider 186. A ball screw actuating device 187 is mounted within the portion 183 of the support and supported rotatably in a thrust bearing 189. The inner member or screw 191 of the ball screw actuator connects to web 190 in the rear end of plug 179. Rotation of the body or nut 192 of the actuator causes the plug to reciprocate on its support, as previously described. The body is rotated by a shaft 194 connected through bevel gears 196 to a radial shaft 195 extending through strut 174 and rotatable by any suitable power actuating device 197.

Cooling gas admitted through line 173 and flowing rearwardly through the passage 177 is discharged into the interior of the support and flows rearwardly through openings in the spider 186 into the interior of the plug 179. The plug is also double-walled and the inner wall has an opening 201 at the rear end of the plug. The cooling gas entering between the double walls of the plug flows from the entrance 201 through the annular passage 202 to the forward end of the plug where it is discharged from the annular open end of the double wall at 203 and is burned in the flame from the combustion chamber. Thus the nozzle plug 179 and its support 175 are cooled by fuel subsequently burned.

As will be apparent, the combustion apparatus of FIGURE 14 and likewise that of the previously described form of the invention may have the area of the outlet varied in accordance with the operating condition of the engine to provide most efficient propulsion under various conditions of speed and altitude. Also, the total fuel flow, the control of fuel flow through the two inlet precoolers, the adjustment of the air inlet doors 27, and the allocation of fuel between the precombustion chamber and the main combustion chamber are variable to provide a broad spectrum of effective operation of the engine. However, my invention is not concerned primarily with the engine overall but rather with the improved combustion chamber and propulsion jet nozzle arrangement, two forms of which have been described.

The description of the preferred embodiments of the invention for the purpose of explaining the principles thereof is not to be considered as limiting or restricting the invention, since many modifications may be made by the exercise of skill in the art.

I claim:

1. A jet propulsion device comprising, in combination, an air duct for conducting combustion air under pressure, a precombustion device supplied with air through the air duct, a heat exchanger supplied with air from the air duct through the precombustion device, a fuel circuit through the heat exchanger, a main combustion chamber supplied with air for combustion from the air duct through the precombustion device and the heat exchanger, the chamber having an outlet for combustion products, a jet propulsion nozzle aligned with the outlet, the nozzle having a throat larger than the said outlet, the nozzle having an entrance passage disposed around the combustion chamber, means including movable air inlet doors operable to admit ambient boundary layer air to or exclude it from the entrance passage, means operable to move the doors and to hold them in desired positions through a range from closed to open, the main combustion chamber and jet propulsion nozzle including double walls adapted for circulation of a cooling medium through the walls, and means for circulating fuel for combustion through the said heat exchanger fuel circuit and the said double walls to the main combustion chamber and the precombustion device for combustion therein.

2. A device as recited in claim 1 including controllable means for varying the area of the combustion chamber outlet.

3. A device as recited in claim 1 including also a compressor connected to supply the said air duct, a turbine connected to drive the compressor, and means to circulate the fuel from the heat exchanger to the turbine as motive fluid for the turbine.

References Cited

UNITED STATES PATENTS

| 3,048,973 | 8/1962  | Benedict      | 239—265.17 |
| 3,237,401 | 3/1966  | Peters et al. | 60—260 XR  |
| 3,323,304 | 6/1967  | Llobet et al. |            |
| 3,302,889 | 2/1967  | Di Sabato     | 60—264 XR  |
| 3,346,193 | 10/1967 | Tumicki       | 239—265.17 |
| 2,390,161 | 12/1945 | Mercier       | 60—264 XR  |
| 2,589,215 | 3/1952  | Atwood        | 60—267     |
| 2,866,313 | 12/1958 | Hall          | 60—264 XR  |
| 2,937,494 | 5/1960  | Johnson       | 60—267 XR  |
| 3,002,340 | 10/1961 | Landerman     | 60—260 XR  |
| 3,018,626 | 1/1962  | Chester       | 60—267 XR  |
| 3,024,606 | 3/1962  | Adams et al.  | 60—267 XR  |
| 3,052,431 | 9/1962  | Compton       | 60—267 XR  |
| 3,172,253 | 3/1965  | Schelp et al. | 60—267 XR  |

FOREIGN PATENTS 1,019,176   10/1952   France.

OTHER REFERENCES

SAE Transactions, 1958, vol. 66, pp. 318, 319 relied on.

CARLTON R. CROYLE, *Primary Examiner.*